United States Patent
Li et al.

(10) Patent No.: US 8,583,161 B2
(45) Date of Patent: Nov. 12, 2013

(54) METHOD OF PERFORMING FEEDBACK LOAD REDUCTION AND RELATED COMMUNICATION DEVICE

(75) Inventors: Jin-Hao Li, Taipei (TW); Hsuan-Jung Su, Taipei (TW); Yu-Chih Jen, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 349 days.

(21) Appl. No.: 12/917,465

(22) Filed: Nov. 1, 2010

(65) Prior Publication Data
US 2011/0269392 A1    Nov. 3, 2011

Related U.S. Application Data

(60) Provisional application No. 61/256,320, filed on Oct. 30, 2009.

(51) Int. Cl.
*H04B 7/00* (2006.01)

(52) U.S. Cl.
USPC ............ 455/522; 455/69; 455/70; 455/67.11; 455/63.1; 370/315; 370/316; 370/317; 370/318; 370/319

(58) Field of Classification Search
USPC .................. 455/522, 69–70, 67.11, 63.1; 370/315–320
See application file for complete search history.

(56) References Cited

U.S. PATENT DOCUMENTS

| 8,295,778 B2 * | 10/2012 | Kotecha et al. ................ 455/69 |
| 2003/0039217 A1 * | 2/2003 | Seo et al. ...................... 370/318 |
| 2006/0135073 A1 * | 6/2006 | Kurapati et al. ........... 455/67.11 |
| 2008/0075032 A1 * | 3/2008 | Balachandran et al. ...... 370/317 |
| 2008/0268785 A1 * | 10/2008 | McCoy et al. ............. 455/67.11 |

OTHER PUBLICATIONS

Max H. M. Costa, Writing on Dirty Paper, IEEE Transactions on Information Theory, vol. IT-29, No. 3, May 1983, p. 439-441.
Hanan Weingarten et al., The Capacity Region of the Gaussian Multiple-Input Multiple-Output Broadcast Channel, IEEE Transactions on Information Theory, vol. 52, No. 9, Sep. 2006, p. 3936-3964.
Masoud Sharif et al., On the Capacity of MIMO Broadcast Channel with Partial Side Information, IEEE 2003, p. 958-962.
Taesang Yoo et al., Multi-Antenna Downlink Channels with Limited Feedback and User Selection, IEEE Journal on Selected Areas in Communications, Sep. 2007, vol. 25, No. 7, p. 1478-1491.
Nihar Jindal, MIMO Broadcast Channels With Finite-Rate Feedback, IEEE Transactions on Information Theory, vol. 52, No. 11, Nov. 2006, p. 5045-5060.
David Gesbert et al., How Much Feedback is Multi-User Diversity Really Worth?, IEEE Communications Society, 2004 IEEE, p. 234-238.
Vegard Hassel et al., Exploiting Multiuser Diversity Using Multiple Feedback Thresholds, 2005 IEEE.

(Continued)

*Primary Examiner* — Fayyaz Alam
(74) *Attorney, Agent, or Firm* — Winston Hsu; Scott Margo

(57) ABSTRACT

A method of performing feedback load reduction for a mobile device in a wireless communication system is disclosed. The method comprises measuring a signal from the network to get Channel State Information (CSI); comparing the measured CSI with at least one threshold and determining one region where the CSI falls in from a plurality of regions divided by the at least one threshold and ranked in order; and sending a rank for the determined region to the network.

10 Claims, 10 Drawing Sheets

(56) References Cited

OTHER PUBLICATIONS

Thomas L. Marzetta et al., Capacity of a Mobile Multiple-Antenna Communication Link in Rayleigh Flat Fading, IEEE Transactions on Information Theory, vol. 45, No. 1, Jan. 1999, p. 139-157.

Randa Zakhour et al., A Two-Stage Approach to Feedback Design in Multi-User MIMO Channels With Limited Channel State Information, The 18th Annual IEEE International Symposium on Personal, 2007, Indoor and Mobile Radio Communications (PIMRC'07).

Taesang Yoo et al., On the Optimality of Multiantenna Broadcast Scheduling Using Zero-Forcing Beamforming, IEEE Journal on Selected Areas in Communications, Vol. 24, No. 3, Mar. 2006, p. 528-p. 541.

Saeed Ghahramani, Third Edition, Fundamentals of Probability With Stochastic Processes, 2005, Pearson Education, Inc.

* cited by examiner

METHOD OF PERFORMING FEEDBACK LOAD REDUCTION AND RELATED COMMUNICATION DEVICE

CROSS REFERENCE TO RELATED APPLICATIONS

This application claims the benefit of U.S. Provisional Application No. 61/256,320, filed on Oct. 30, 2009 and entitled "Methods and Apparatus for Reducing the Feedback Load Reduction in Multiuser MIMO Systems", the contents of which are incorporated herein.

BACKGROUND OF THE INVENTION

1. Field of the Invention

The application relates to a method used in a wireless communication system and related communication device, and more particularly to, a method for performing feedback load reduction in a wireless communication system and related communication device.

2. Description of the Prior Art

Multiple antennas can provide spatial diversity in wireless fading channels to improve the communication quality. On the other hand, multiple antennas can also create (virtually) multiple channels to increase the system throughput. For the downlink broadcast channel employing multiple antennas, it has been shown recently that dirty paper coding (DPC) achieves the capacity. However, the capacity achieving scheme of the downlink multiple-input multiple-output (MIMO) broadcast channel is difficult to derive. In addition, the vector DPC for such a scheme has a high encoding/decoding complexity. Thus, several works resorted to more practical (but suboptimal), space division multiple access (SDMA) based designs. For example, zero-forcing beamforming (ZF-BF) was to achieve the optimal sum rate growth. However, both DPC and ZF schemes require perfect channel state information (CSI) feedback from the users to the base station (BS) to achieve the optimal performance. This may result in high feedback load and is not practical.

In some studies, a model was proposed to analyze the sum rate loss due to imperfect quantized CSI. In the system considered there, each user quantizes the channel vector to one of the $N=2^B$ quantization vectors and feeds back the codebook index to the BS to capture the spatial direction and magnitude of the channel. To reduce the feedback load, orthogonal random beamforming (ORB) can be used. In the ORB, the BS transmits through orthogonal BF vectors to the users, and each user only needs to feedback its received signal-to-interference-plus-noise ratios (SINR) on different orthogonal BF vectors for the purpose of scheduling. The sum rate performance of the ORB may exhibit the same growth rate as the DPC and ZF BF based schemes when the number of users is large.

There are other works that sought to reduce the feedback load at the scheduling stage. For example, a threshold is set such that a user does not need to feedback when its CSI is below the threshold. This method reduces the system feedback load without affecting the scheduling performance much. In another example, multiple thresholds are set, and the scheduler utilizes a polling process to select the best feedback threshold from these multiple thresholds to further reduce the aggregate feedback load. This method, however, incurs delay due to the polling process. In addition, another scheme was proposed to reduce the feedback load of ZF BF systems through a two-stage feedback. In the first stage, each user feeds back the coarsely quantized version of its CSI, and thus the BS has some information to schedule the users. The BS then broadcasts to the scheduled users and the scheduled users will feedback finer CSI to achieve good ZF BF performance. The drawback of this scheme is also the delay due to the second stage feedback.

According to active user's feedback CSI to scheduler (e.g. BS), the scheduler can adjust the modulation and coding scheme to improve the system throughput and schedule users by channel dependent scheduling algorithm to achieve multi-user diversity gain. However, the feedback load is large when the number of active users is large.

SUMMARY OF THE INVENTION

A method of performing feedback load reduction in a wireless communication system and related communication device are provided.

A method of performing feedback load reduction for a mobile device in a wireless communication system is disclosed. The method comprises measuring a signal from the network to get Channel State Information (CSI); comparing the measured CSI with at least one threshold and determining one region where the CSI falls in from a plurality of regions divided by the at least one threshold and ranked in order; and sending a rank for the determined region to the network.

A method of performing feedback load reduction for a network in a wireless communication system is disclosed, wherein the wireless communication system comprises a plurality of mobile devices. The method comprises receiving channel state informations (CSIs) from each mobile device; setting at least one threshold for each mobile device according to the respective CSI; assigning the number of allotted bits to each region for each mobile device wherein each region is divided by the at least one threshold; and broadcasting the multiple thresholds and the number of the allotted bits to the plurality of mobile devices.

A communication device of performing feedback load reduction in a wireless communication system is disclosed. The communication device comprises means for measuring a signal from the network to get Channel State Information (CSI); means for comparing the measured CSI with at least one threshold and determining one region where the CSI falls in from a plurality of regions divided by the at least one threshold and ranked in order; and means for sending a rank for the determined region to the network.

A communication device of performing feedback load reduction in a wireless communication system is disclosed, wherein the wireless communication system comprises a plurality of mobile devices. The communication device comprises means for receiving channel state informations (CSIs) from each mobile device; means for setting at least one threshold for each mobile device according to the respective CSI; means for assigning the number of allotted bits to each region for each mobile device wherein each region is divided by the at least one threshold; and means for broadcasting the multiple thresholds and the number of the allotted bits to the plurality of mobile devices.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
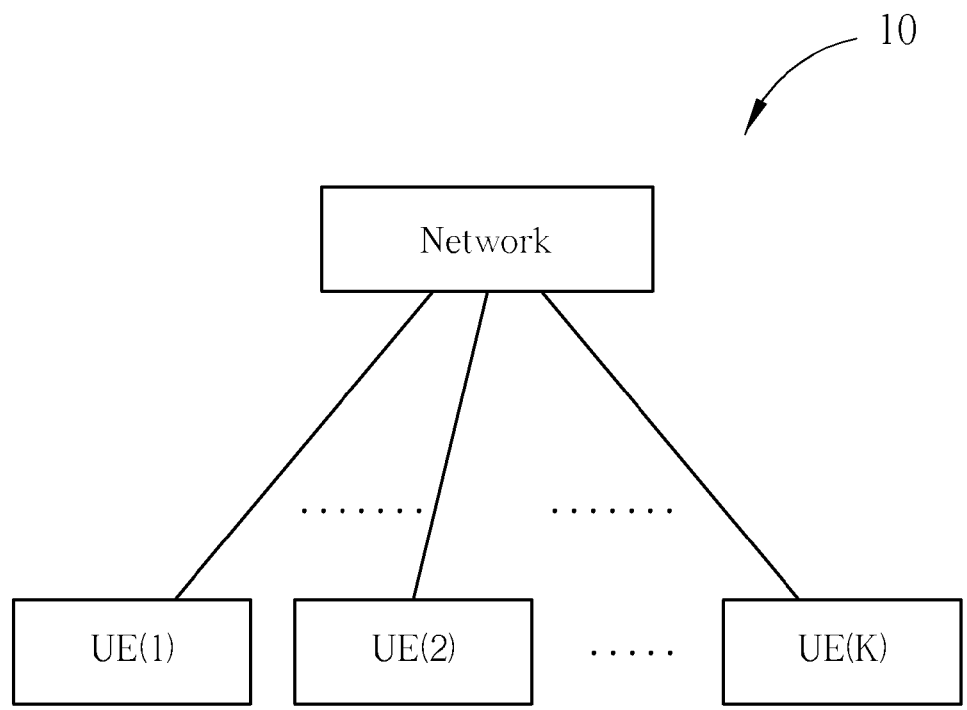
FIG. 1 is a schematic diagram of an exemplary wireless communication system.

Please refer to FIG. 1, which is a schematic diagram of an exemplary wireless communication system 10. The wireless communication system 10, such as a long-term evolution (LTE) system, Universal Mobile Telecommunications System (UMTS) or other mobile communication systems, comprises briefly a network and a plurality of user equipments (UEs) wherein the UEs can be mobile devices such as mobile phones, laptops, etc.

In FIG. 1, the network and the UEs are simply utilized for illustrating the structure of the wireless communication system 10. Practically, the network of the UMTS system, UMTS Terrestrial Radio Access Network (UTRAN), comprises a plurality of base stations, known as Node-Bs (NBs). The network of the LTE system, evolved-UTAN E-UTRAN (E-UTRAN), comprises a plurality of base stations, known as evolved Node-Bs (eNBs). Besides, the network and the UE can be seen as a transmitter or receiver according to transmission direction, e.g., for uplink, the UE is the transmitter and the network is the receiver, and for downlink, the network is the transmitter and the UE is the receiver.

Figure 2:
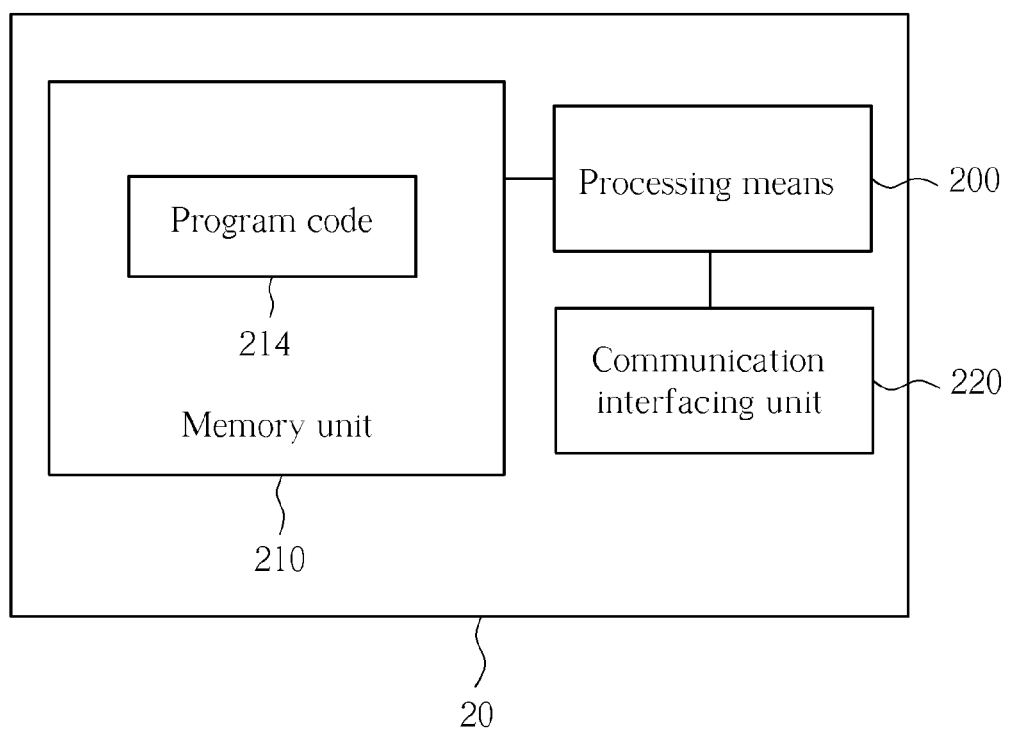
FIG. 2 is a schematic diagram of an exemplary communication device.

FIG. 2 is a schematic diagram of an exemplary communication device 20. The communication device 20 can be the UEs shown in FIG. 1 and may include a processor 200 such as a microprocessor or ASIC, a memory unit 210, and a communication interfacing unit 220. The memory unit 210 may be any data storage device that can store program code 214, for access by the processor 200. Examples of the memory unit 210 include but are not limited to a subscriber identity module (SIM), read-only memory (ROM), random-access memory (RAM), CD-ROMs, magnetic tapes, hard disks, and optical data storage devices. The communication interfacing unit 220 is preferably a radio transceiver for wirelessly communicating with the network according to processing results of the processor 200.

Figure 10:
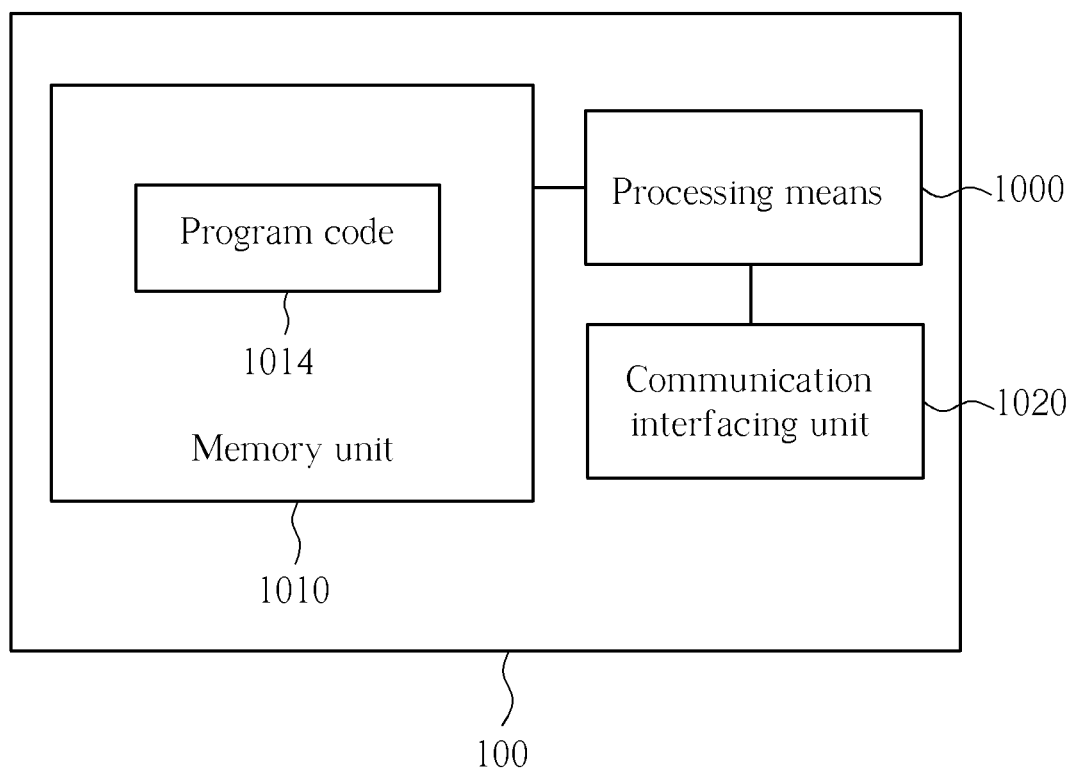
FIG. 10 is a schematic diagram of an exemplary communication device.

FIG. 10 is a schematic diagram of an exemplary communication device 100. The communication device 100 can be the network shown in FIG. 1 and may include a processor 1000 such as a microprocessor or ASIC, a memory unit 1010, and a communication interfacing unit 1020. The memory unit 1010 may be any data storage device that can store program code 1014, for access by the processor 1000. Examples of the memory unit 1010 include but are not limited to a subscriber identity module (SIM), read-only memory (ROM), random-access memory (RAM), CD-ROMs, magnetic tapes, hard disks, and optical data storage devices. The communication interfacing unit 1020 is preferably a radio transceiver for wirelessly communicating with the network according to processing results of the processor 1000.

Figure 3:
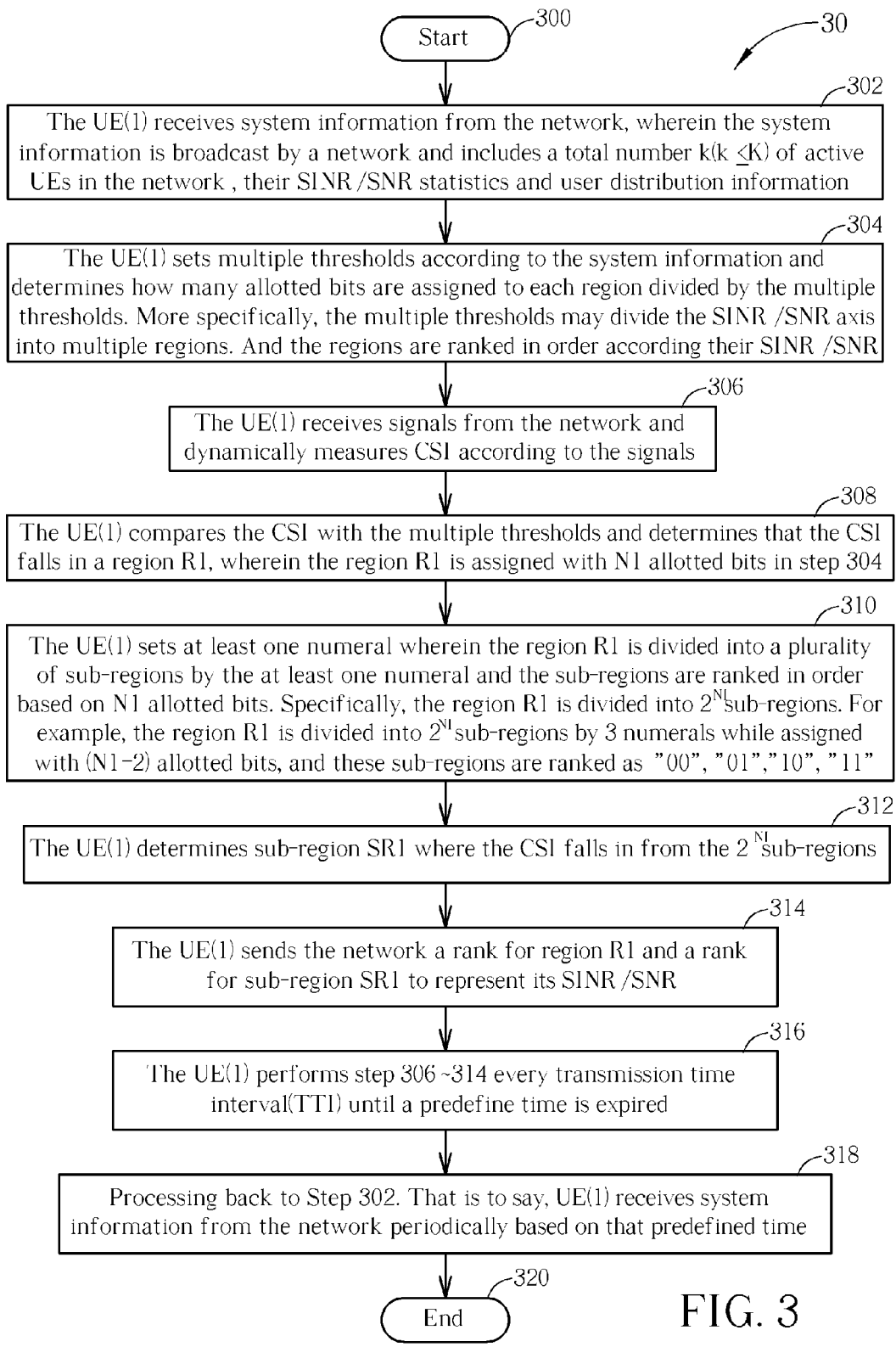
FIG. 3 is a flowchart of an exemplary process.

Please refer to FIG. 3, which is a flowchart of an exemplary process 30. The process 30 is utilized for performing feedback load reduction for a UE(1) in the wireless communication system 10 and can be compiled into the program code 214 of UE(1). The wireless communication system 10, preferably, is a multiple-input multiple output (MIMO) system and includes multiple UEs UE(1), UE(2), UE(3), . . . , UE(K), where K is an arbitrary number. The UEs UE(1), UE(2), UE(3), . . . , UE(K) may have independent or identical statistics distributions of Signal to Interference and Noise Ratio/Signal to Noise Ratio (SINR/SNR). It is noted that each UE can measure the signal quality of the signal from network to get the respective Channel State Information (CSI), e.g. SINR/SNR. The process 30 includes the following steps:

Step 300: Start.

Step 302: The UE(1) receives system information from the network, wherein the system information is broadcast by a network and includes a total number k (k≤K) of active UEs in the network, their SINR/SNR statistics and user distribution information.

Step 304: The UE(1) sets multiple thresholds according to the system information and determines how many allotted bits are assigned to each region divided by the multiple thresholds. More specifically, the multiple thresholds may divide the SINR/SNR axis into multiple regions. And the regions are ranked in order according their SINR/SNR.

Step 306: The UE(1) receives signals from the network and dynamically measures Channel State Information (CSI) according to the signals.

Step 308: The UE(1) compares the CSI with the multiple thresholds and determines that the CSI falls in a region R1, wherein the region R1 is assigned with N1 allotted bits in step 304.

Step 310: The UE(1) sets at least one numeral wherein the region R1 is divided into a plurality of sub-regions by the at least one numeral and the sub-regions are ranked in order based on N1 allotted bits. Specifically, the region R1 is divided into $2^{N1}$ sub-regions. For example, the region R1 is divided into $2^2$ sub-regions by 3 numerals while assigned with (N1=2) allotted bits, and these sub-regions are ranked as "00", "01", "10", "11".

Step 312: The UE(1) determines sub-region SR1 where the CSI falls in from the $2^{N1}$ sub-regions.

Step 314: The UE(1) sends the network a rank for region R1 and a rank for sub-region SR1 to represent its SINR/SNR.

Step 316: The UE(1) performs step 306~314 every transmission time interval (TTI) until a predefine time is expired.

Step 318: Processing back to Step 302. That is to say, UE(1) receives system information from the network periodically based on that predefined time.

Step 320: End.

In step 302, the system information may be referred as to a dedicated message, such as a configuration message, radio resource control (RRC) message, media access control (MAC) message or physical layer signaling.

Preferably, in step 304, the better SINR/SNR the region corresponds to, the more allotted bits are assigned. One the other hand, no allotted bits will be assigned to one region when the corresponding SINR or SNR is lower than a minimum value. As a result, feedback load can be reduced for the network. Please note that all the UEs UE(1), . . . UE(k) in the cell may go through the process 30 as mentioned.

In some examples, each region may correspond to one of all possible ranks of the UE(1) by SNR/SINR distribution. The UE(1) may set multiple thresholds according the probabilities of all possible ranks among all UEs in the wireless communication system 10. The UE(1) may estimate its rank by calculating probabilities of its all possible ranks among all UEs according to the statistics distribution of the SINR or the SNR, channel statistics, and user distribution information. Then, the UE(1) determines its rank according to the probabilities. Namely, the rank having the largest probability among all possible ranks may be determined as the rank of the UE(1), given the SINR/SNR. Please noted that, in other examples, the regions may also be set according to other criteria and thus not limited herein.

For example, the multiple thresholds for a given direction of beamforming can be expressed in a set $R_{th}=\{r_{th}, r_{th,N-1} \ldots, r_{th,1}\}$. A region index j is defined as follows $r_{th,j} \leq SINR \leq r_{th,j-1}$, $j=1, 2 \ldots, N$. N could be any arbitrary integer. In some examples, there may be only one threshold or even no threshold set. Let $X_{(1)}, X_{(2)}, \ldots, X_{(k)}$, be the order statistics of independent identical distribution (i.i.d) continuous random variables $X_{(1)}, X_{(2)}, \ldots, X_{(k)}$, with the common probability density function (PDF) in a descending order, i.e., $X_{(1)} \leq X_{(2)} \leq, \ldots \leq X_{(k)}$. When a UE(k) has on its i-th direction $SINR_{k,i} = sinr_{k,i}$, the probability that UE(k)'s SINR on the i-th beam is ranked the p-th among all UEs is given by:

$$P\{X_k = X_{(p)} \mid X_k = sinr_{k,i}\} = \frac{P\{X_k = X_{(p)}\}}{P\{X_k = sinr_{k,i}\}} = \frac{(K-1)!\{F_{SINR}(sinr_{k,i})\}^{K-p}\{1-F_{SINR}(sinr_{k,i})\}^{p-1}}{(K-p)!(p-1)!},$$

and $$\sum_{p=1}^{K} P\{X_k = X_{(p)} \mid X_k = sinr_{k,i}\} = 1,$$

Where the $F_{SINR}(sinr_{k,i})$ is the cumulative distribution function (CDF) of random variable SINR/SNR. For example, the probability that the UE(k) has the highest SINR among all UEs is $P\{X_k = X_{(p)} \mid X_k = sinr_{k,i}\} = \{F_{SINR}(sinr_{k,i})\}^{K-1}$. With $SINR_{k,i} = sinr_{k,i}$, UE(k) can infer its most possible rank among all UEs on the i-th direction as $$\text{rank}(sinr_{k,i}) = \arg \max_{p=1,2 \ldots K} \{P\{X_k = X_{(p)} \mid X_k = sinr_{k,i}\}\}.$$

In the region j, $\text{rank}(sinr_{k,i})=j, j=1, 2 \ldots N$. The corresponding thresholds $r_{th,j}, j=1, 2, \ldots N$ can be determined. Preferably, the values of the thresholds may be updated periodically according to the system configuration.

The UE(1) may send $b_r = \log_2 (N)$ feedback bits to the network for each beam to indicate its most possible rank, i.e. region R1, on the corresponding beam. In order to account for the situation where there are more than one UEs reporting to have the same rank, each region j is further quantized with $b_j$ bits and divided into $2^{(b_j)}$ sub-regions. In addition to the $b_r$ bits, the UEs also feedback $b_j$ bits, so the network will be able to differentiate UEs with the same rank, i.e. region R1.

Note that classifying UEs by their possible ranks and letting only the UEs with higher ranks to feed back can reduce the aggregate feedback load. In addition, the UE(1) may set a minimum value of the SINR1/SNR1. The UE(1) may determine not to send any feedback bit $b_r$ or $b_j$ to the network when the SINR1/SNR1 is lower than the minimum value even if the UE(1) ranks high among all UEs. When the UE(1) receives poor SINR1/SNR1 and only a few other UEs are operated in the wireless communication system 10, the UE(1) having poor SINR1/SNR1 may still rank high. In this situation, the present disclosure may prevent the UE(1) from sending feedback bits to the network. Please note that the aforementioned multi-threshold scheme can be applied to any distribution of the SINR1/SNR1, and not limited to a multi-antenna technology.

Figure 4:
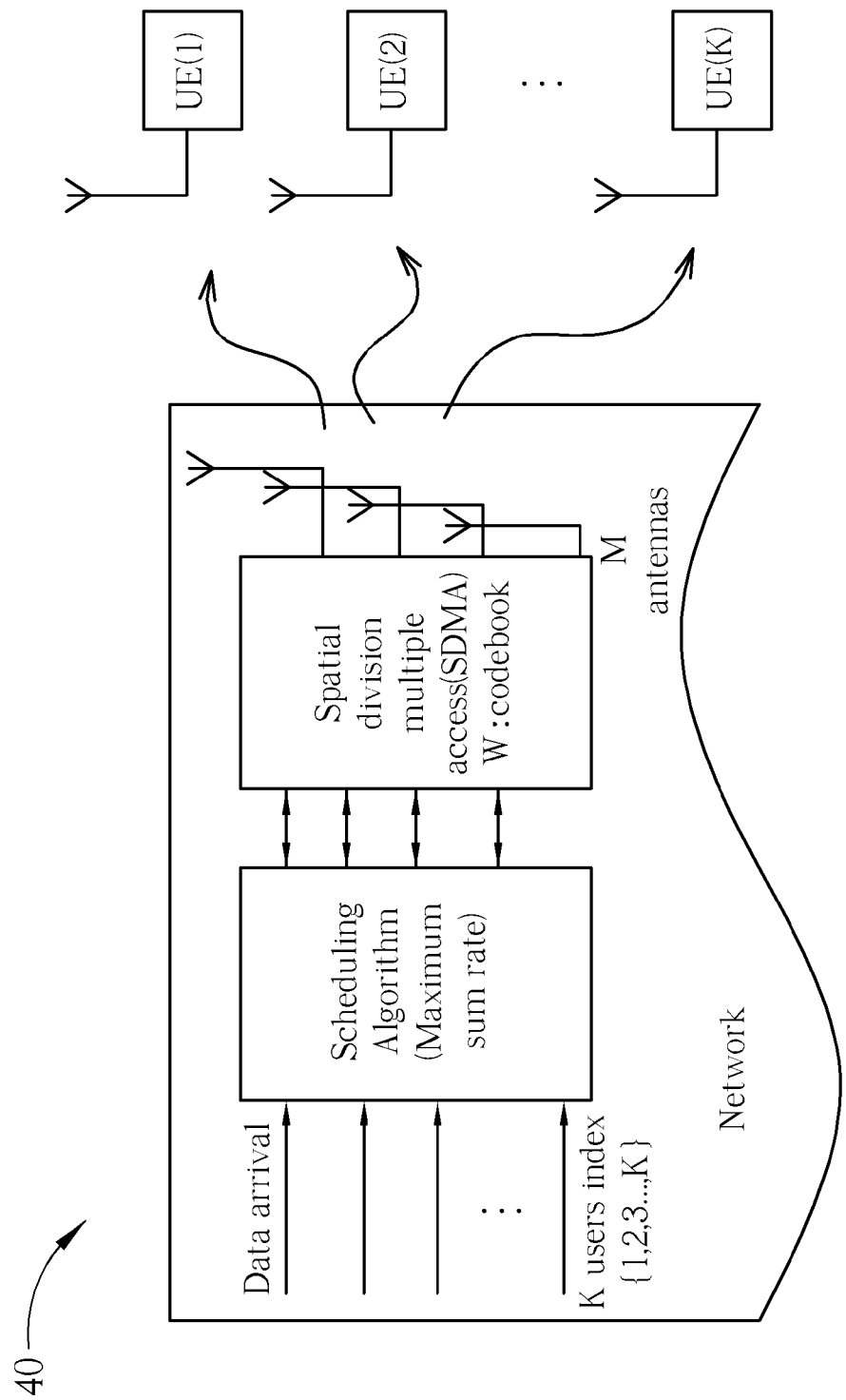
FIG. 4 illustrates an exemplary base station in a multi-user (MU)-MIMO system.
Figure 5:
FIG. 5 illustrates an exemplary table.

Please refer to FIG. 4, which illustrate an exemplary multi-user (MU)-MIMO system 40. The MU-MIMO system comprises UEs UE(1), UE(2), UE(3), . . . , UE(K) and a network. Considering the MU-MIMO system 40, the network is equipped with M antennas and there are K receivers each having single receive antenna. Please noted that the invention can also apply to the case each receiver has multiple antennas. According to an orthogonal random beamforming (ORB) strategy for multi-user transmission, the network uses a precoding matrix $W=[w_1, w_2 \ldots w_M]$, where $W=[w_1, w_2, \ldots w_M]$, $w_i \in C^M$, $i=1, 2 \ldots M$, are random orthogonal vectors generated from isotropic distribution. Please refer to an exemplary table 50 shown in FIG. 5. The average feedback loads for K UEs in different kind of schemes are summarized in the Table 50. A type-I scheme is multi-threshold scheme. If the UE's SINR value exceeds the minimum value of SINR/SNR$r_{th}$ and belongs to region j, it will feedback $b_r + b_j$ bits. In the low SINR region, i.e. SINR<$r_{th}$, the UE does not send any feedback bit because the UE may experience deep fading channel or high interference. Therefore, the scheduler seldom selects this UE to transmit signal. The type-II scheme has one threshold, and emphases the resolution of high SINR region due to maximum sum rate scheduling algorithm. If the SINR exceeds the threshold $r_{th,1}$, it feeds back $$b_q = \sum_{j=1}^{N} b_j$$

bits to the network to quantize the SINR value. The type-III scheme is the traditional feedback scheme (no thresholds), no matter what the SINR value is, the UE quantizes it by $b_q$ bits. Finally, the type-IV scheme is a one-threshold special case, where the UE uses $b_q$ bits to quantize the region [$r_{th}$, ∞) when its SINR value exceeds $r_{th}$.

Figure 6:
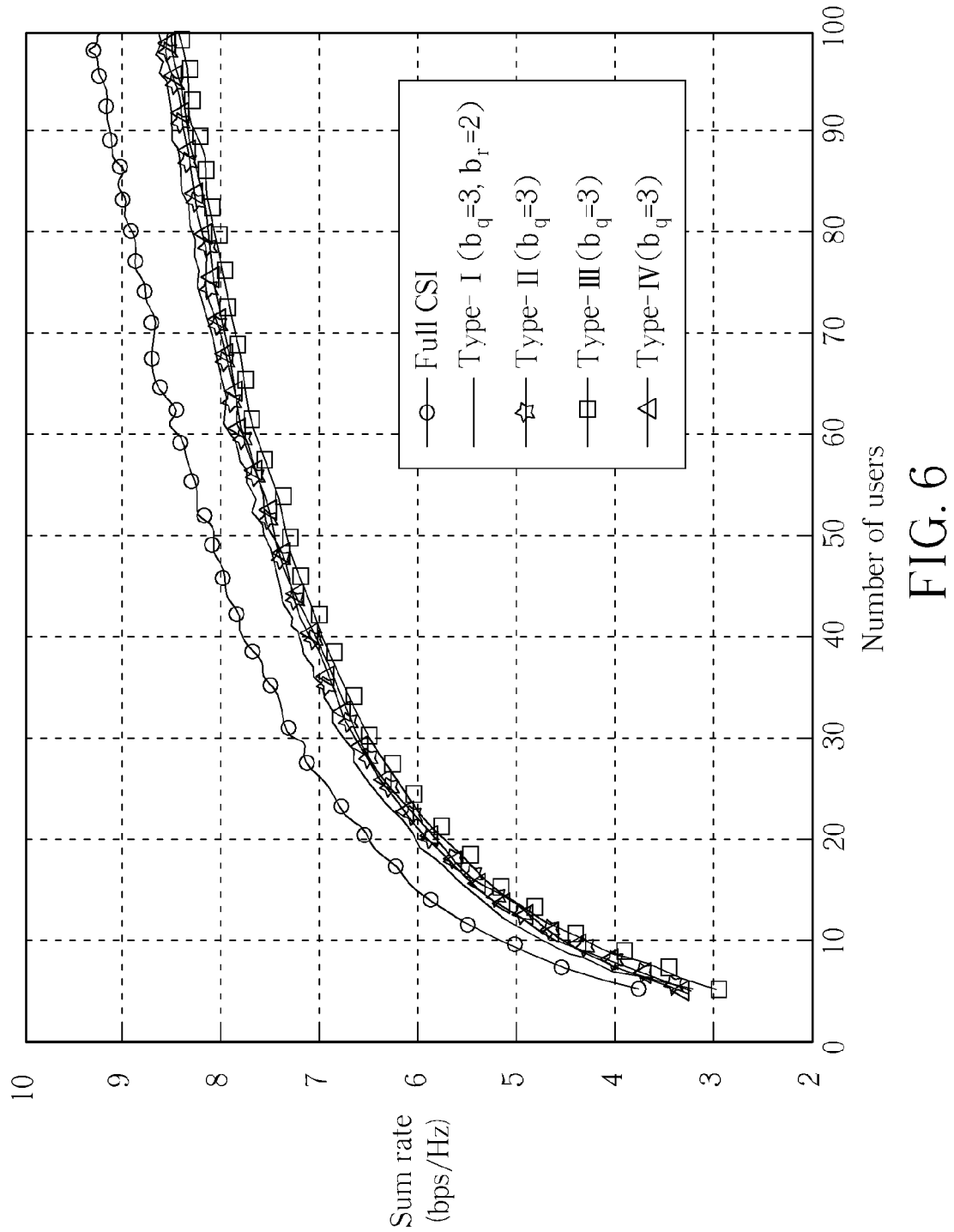
FIG. 6 illustrates a diagram of the number of UEs vs. sum rate.
Figure 7:
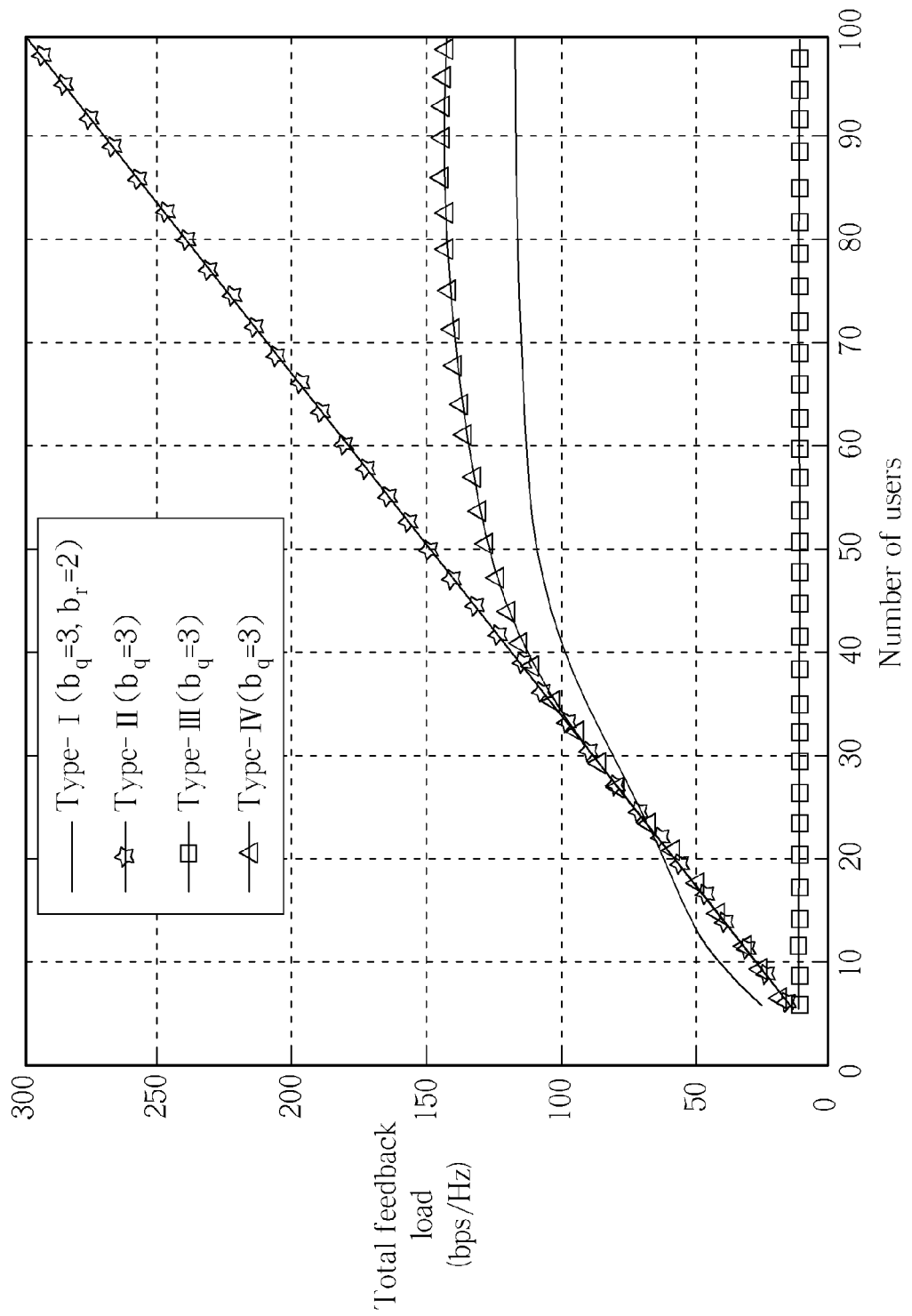
FIG. 7 illustrates a diagram of the number of UEs vs. the total feedback bits.
Figure 8:
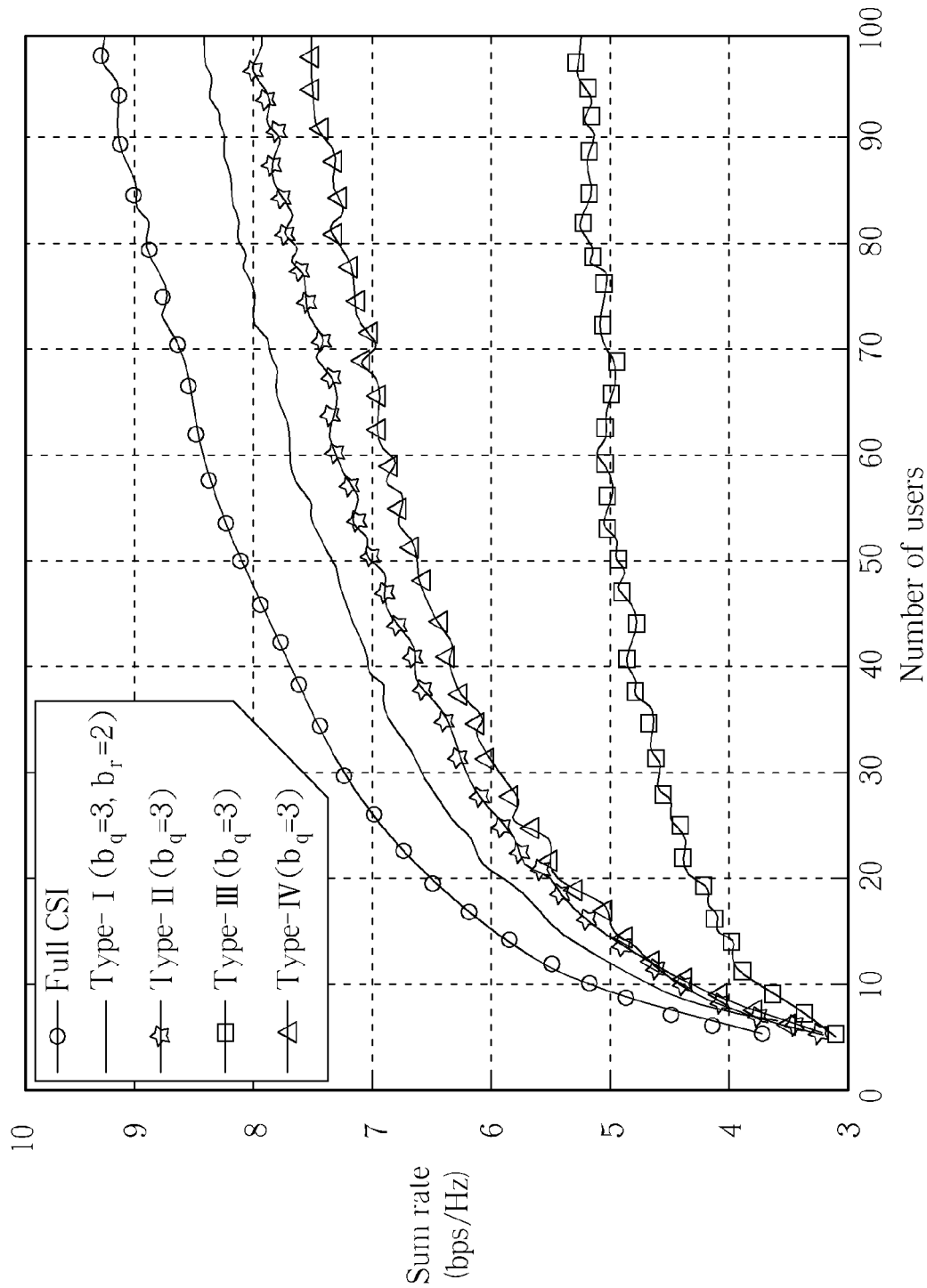
FIG. 8 illustrates a diagram of the number of UEs vs. sum rate.

Please refer to FIGS. 6 and 7, the type-I scheme not only has better sum rate performance than others but also reduces a large amount of feedback load when the number of the active UEs is large. However, the total numbers of feedback bits per UE are fair among these schemes. For the fair comparison between these types, the number of feedback bits per UE is constrained to $b_q$ for these schemes to evaluate the sum rate performance. In FIG. 8, it is shown that the type-I scheme has better performance than other the schemes under the same feedback bits condition. Thus, the type-I feedback scheme is a more efficient way to reduce feedback load.

Figure 9:
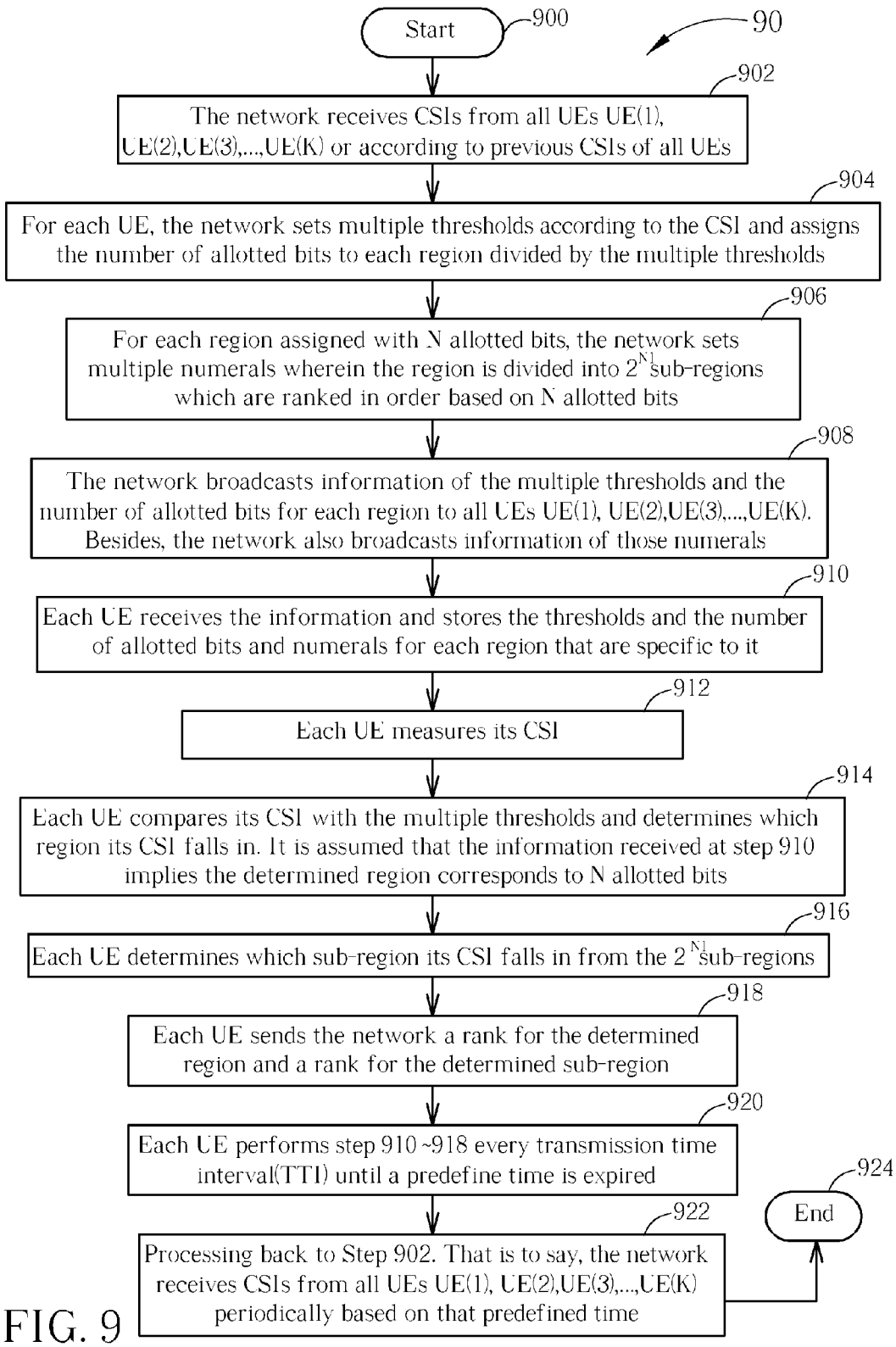
FIG. 9 is a flowchart of another exemplary process.

Not only can the UE set the multiple thresholds but also the network can determine the multiple thresholds. Please refer to FIG. 9, which is a flowchart of an exemplary process 90. The process 90 is utilized for performing feedback load reduction for a wireless communication system. The wireless communication system is a multiple-input multiple output (MIMO) system and includes multiple UEs UE(1), UE(2), UE(3), . . . , UE(K), where K is an arbitrary number. The UEs UE(1), UE(2), UE(3), . . . , UE(K) may have independent or identical statistics distributions of SINR/SNR. The process 90 includes the following steps:

Step 900: Start.

Step 902: The network receives CSIs from all UEs UE(1), UE(2), UE(3), . . . ,UE(K) or according to previous CSIs of all UEs.

Step 904: For each UE, the network sets multiple thresholds according to the CSI and assigns the number of allotted bits to each region divided by the multiple thresholds.

Step 906: For each region assigned with N allotted bits, the network sets multiple numerals wherein the region is divided into $2^N$ sub-regions which are ranked in order based on N allotted bits.

Step 908: The network broadcasts information of the multiple thresholds and the number of allotted bits for each region to all UEs UE(1), UE(2), UE(3), ..., UE(K). Besides, the network also broadcasts information of those numerals.

Step 910: Each UE receives the information and stores the thresholds and the number of allotted bits and numerals for each region that are specific to it.

Step 912: Each UE measures its CSI.

Step 914: Each UE compares its CSI with the multiple thresholds and determines which region its CSI falls in. It is assumed that the information received at step 908 implies the determined region corresponds to N allotted bits.

Step 916: Each UE determines which sub-region its CSI falls in from the $2^N$ sub-regions.

Step 918: Each UE sends the network a rank for the determined region and a rank for the determined sub-region.

Step 920: Each UE performs step 910~918 every transmission time interval (TTI) until a predefine time is expired.

Step 922: Processing back to Step 902. That is to say, the network receives CSIs from all UEs UE(1), UE(2), UE(3), ..., UE(K) periodically based on that predefined time.

Step 924: End.

Please noted that step 902~908 can be compiled into the program code 1014 of the network while step 910~920 can be compiled into the program code 214 of UE(1).

Please noted that, in other examples, the regions may also be set according to other criteria and thus not limited herein.

According to the process 90, the network keeps track of the CSI (e.g. SINR/SNR) fed back from the UEs UE(1), UE(2), UE(3), ..., UE(K). Periodically, the network uses the past CSIs from all UEs to derive the multiple thresholds and the number of allotted bits for each region. The multiple thresholds and the number of allotted bits for each region could be specific to UEs. The network broadcast the multiple thresholds and the number of allotted bits for each region to the UEs UE(1), UE(2), UE(3), ..., UE(K) by system information, periodically. Each UE periodically receives the system information and stores the multiple thresholds and number of allotted bits for each region that are specific to it. At every transmission time interval (TTI), the UEs UE(1), UE(2), UE(3), ..., UE(K) measure the CSI (e.g. SINR/SNR) of the signals from the network to it. The UE then determines which region and which sub-region its SINR/SNR falls in and sends the corresponding ranks to the network.

In addition, the number of the feedback bits may be determined by the SNR/SINR reported by the UEs. In other words, the network may determine that the UE having a better SNR/SINR should send more feedback bits to the network and the UE having a worse SNR/SINR should send less feedback bits to the network. In addition, for those UEs having poor SINR/SNR in the wireless communication system, they may send a few feedback bits or no feedback bit to the network. As a result, feedback load can be reduced for the network according to the multi-threshold method.

The operations of setting multiple thresholds can be found above, and thus omitted herein.

Please note that the abovementioned steps including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20/100 in which the processor 200/1000 processes the program code 214/1014 related to the abovementioned processes and the processed results can perform feedback load reduction in the wireless communications system 20/1000.

To sum up, the network in process 90 may determine the thresholds and the number of allotted bits for each region according the SINR/SNR statistics and user distribution. The UE thereby dynamic determining the number of the feedback bits sent to the network according to which region its received SINR/SNR falls in. Alternatively, the multiple thresholds could be set by UE itself according to the available system information in process 30. The UE can dynamically determine the number of the feedback bits to use according to the multiple thresholds. Consequently, the feedback load can be reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of performing feedback load reduction for a mobile device in a wireless communication system, the method comprising:

measuring a signal from a network to get Channel State Information (CSI);

comparing the measured CSI with at least one threshold and determining one region where the CSI falls in from a plurality of regions divided by the at least one threshold and ranked in order;

sending a rank for the determined region to the network;

receiving system information broadcasted by a network wherein the system information comprises a number of the mobile devices in the wireless communication system; and setting the at least one threshold according to the measured CSI and the system information.

2. The method of claim 1 further comprising:

setting at least one numeral according to at least one allotted bit wherein the determined region is divided into a plurality of sub-regions by the at least one numeral and the sub-regions are ranked in order based on the at least one allotted bit;

determining one sub-region where the CSI falls in from the sub-regions; and sending a rank for the determined sub-region to the network.

3. The method of claim 1 further comprising:

assigning the number of allotted bits to each region;

setting at least one numeral when the determined region is assigned with at least one allotted bit wherein the determined region is divided into a plurality of sub-regions by the at least one numeral and the sub-regions are ranked in order based on the at least one allotted bit;

determining one sub-region where the CSI falls in from the sub-regions; and sending a rank for the determined sub-region to the network.

4. The method of claim 3, wherein the CSI comprises signal-to-interference ratio (SINR) or signal-to-noise ratio (SNR); and assigning the number of allotted bits to each region comprises assigning more allotted bits to one region when the corresponding SINR or SNR is higher.

5. The method of claim 3, wherein the CSI comprises signal-to-interference ratio (SINR) or signal-to-noise ratio (SNR); and assigning the number of allotted bits to each region comprises assigning no allotted bits to one region when the corresponding SINR or SNR is lower than a minimum value.

6. A communication device of performing feedback load reduction in a wireless communication system, the communication device comprising:
   means for measuring a signal from a network to get Channel State Information (CSI);
   means for comparing the measured CSI with at least one threshold and determining one region where the CSI falls in from a plurality of regions divided by the at least one threshold and ranked in order;
   means for sending a rank for the determined region to the network;
   means for receiving system information broadcasted by a network wherein the system information comprises a number of the mobile devices in the wireless communication system; and
   means for setting the at least one threshold according to the measured CSI and the system information.

7. The communication device of claim 6 further comprising:
   means for setting at least one numeral according to at least one allotted bit wherein the determined region is divided into a plurality of sub-regions by the at least one numeral and the sub-regions are ranked in order based on the at least one allotted bit;
   means for determining one sub-region where the CSI falls in from the sub-regions; and
   means for sending a rank for the determined sub-region to the network.

8. The communication device of claim 6 further comprising:
   means for assigning the number of allotted bits to each region;
   means for setting at least one numeral when the determined region is assigned with at least one allotted bit wherein the determined region is divided into a plurality of sub-regions by the at least one numeral and the sub-regions are ranked in order based on the at least one allotted bit;
   means for determining one sub-region where the CSI falls in from the sub-regions; and
   means for sending a rank for the determined sub-region to the network.

9. The communication device of claim 8, wherein the CSI comprises signal-to-interference ratio (SINR) or signal-to-noise ratio (SNR); and assigning the number of allotted bits to each region comprises assigning more allotted bits to one region when the corresponding SINR or SNR is higher.

10. The communication device of claim 8, wherein the CSI comprises signal-to-interference ratio (SINR) or signal-to-noise ratio (SNR); and assigning the number of allotted bits to each region comprises assigning no allotted bits to one region when the corresponding SINR or SNR is lower than a minimum value.

* * * * *